June 20, 1950 H. D. WILSON 2,512,080
BATTERY TERMINAL CONSTRUCTION
Filed May 25, 1945

INVENTOR.
HARLAND D. WILSON
BY
*Falvey Southee & Stoltenberg*
ATTORNEYS

Patented June 20, 1950

2,512,080

UNITED STATES PATENT OFFICE 2,512,080

BATTERY TERMINAL CONSTRUCTION

Harland D. Wilson, Toledo, Ohio

Application May 25, 1945, Serial No. 595,770

3 Claims. (Cl. 136—168)

This invention relates to batteries.

This invention is more particularly adapted to be used in electric storage batteries of the lead-acid type; electrochemical devices for storing energy in chemical form, so that it can be released as electricity.

This invention is directed to the terminal constructions of such a device and has particular utility in sealing the apertures about the terminal posts.

Another object of this invention is to provide reinforcements for the battery cover, especially in the regions about the terminal posts.

Still another object of this invention is to indefinitely maintain the sealing between the terminal posts and the cover under all normal working conditions to which the battery may be subjected.

Still another object of this invention is to provide battery terminal constructions of inherent strength which are easily assembled and form acid-tight seals between the posts and container and maintain such seals for the life of the battery.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figure 1:
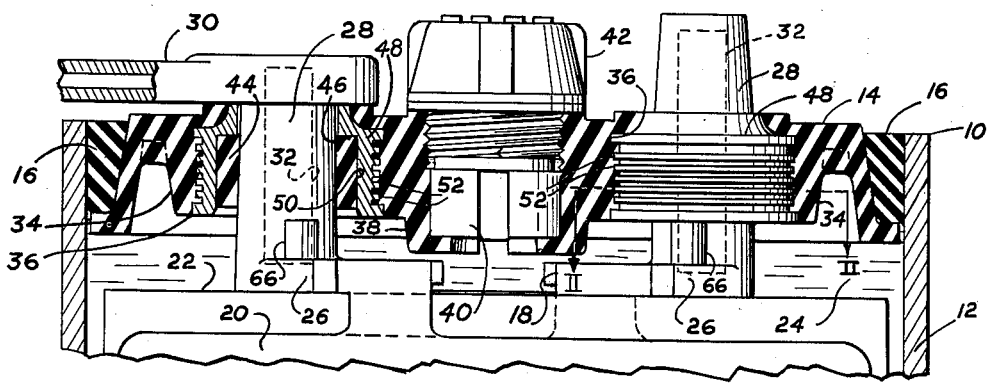
Fig. 1 is a section through the upper portion of a storage battery having features of the invention incorporated therein.
Figure 2:
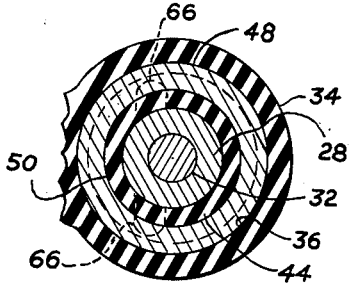
Fig. 2 is a view on the line II—II, Fig. 1.

Storage battery 10 comprises container 12 which may be of molded hard rubber or some suitable bituminous composition and is provided with cover 14 of a similar or like material having acid-tight seal 16 therewith.

Within the container 12 is an energy source assembly including a series of positive plates 18, negative plates 20, separators 22, and an electrolyte 24. Groups of the alternating plates are assembled with post straps 26 extending from terminal posts 28. These posts are designed to have various connections attached thereto as, for example, a cell connector 30 or an electric supply cable (not shown). The post straps and terminal posts may be of some suitable material, as for example, a casting of an alloy of lead and antimony. Such constructions may be reinforced by tin-plated copper pins 32 which not only strengthen the posts but increase the electrical conductivity thereof while at the same time these pins are fully protected from attack by the electrolyte of the battery or other corrosive substances. In the production of the molded covers 14 strength is imparted thereto by providing bosses 34 extending therefrom, which bosses 34 provide sufficient foundation for the terminal structures. These bosses have apertures 36 therethrough, axially of which the terminal posts may extend from the energy-storing means within the container to the exterior thereof for receiving the desired connections. In batteries of this type there is also provided a boss 38 for each cell having filler openings 40 therethrough, which openings are normally closed by vent plugs 42.

By hithertofore known construction it was not uncommon to have the acids from the battery seep therefrom through the apertures 36, thus causing exterior corrosion of the parts and other damage. It is the purpose of this invention to cure this defect, not only temporarily but for the life of the battery as used under normal working conditions. To this end, a flexible bushing 44, of resilient material such as live or an acceptable synthetic rubber preferably of the Buna or Chloroprene types of a Shore Durometer hardness of 40 to 55, known under trade-names of GR—S or Neoprenes FR and GN is placed about the terminal post 28 and may be directly inserted between the post and the boss 34 and resting against a seat formed thereon. In the assembly, this bushing 44 is preferably held under compression between the inner face of the boss, the seat, and the outer face of the terminal post.

Under ideal working conditions, this assembly would ordinarily provide ample protection against acid leakage but under the usual conditions encountered by batteries of this type, it has been found that in time the moldable compositions from which the covers are fabricated have a tendency to shrink or flow, especially when subjected to temperature changes accompanied by jarring and vibrations. Under these latter conditions, even to the extent encountered in military vehicles, means are provided by this invention to defeat such reactions. As a desirable solution of this problem, rings 48 made of a suitable material not affected by the action of the electrolyte, preferably an alloy of lead and antimony are placed as linings for the apertures 36 and provide recesses 50 about the terminal posts. These rings may be simple die-castings rigid in comparison to the cover-forming materials. In this type of construction, the flexible bushings 44 are compressed within the recess 50 about the terminal posts and held against the seats 46 therein. Means may be provided securely to anchor the rings 48 with the cover and are herein shown as a plurality of one or more fins 52 extended from and embedded in the bosses and body. This construction provides a securely held ring, which, in turn, serves as a reinforcement for the cover in the vicinity about the terminal post.

Figure 3:
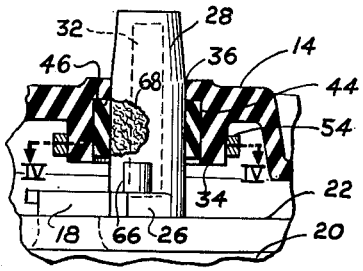
Fig. 3 is a fragmentary section through the cover of a storage battery embodying a modified form of terminal seal.
Figure 4:
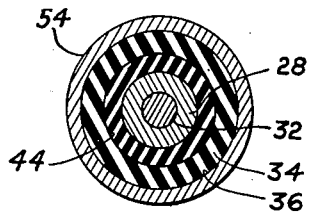
Fig. 4 is a view on the line IV—IV, Fig. 3.

This same effect may be accomplished, as shown in Figure 3, when the flexible bushing lies directly between the terminal post and boss, by surrounding the exterior of the boss with a reinforcement or restraining band or ring 54 of comparatively rigid material pressed into location. This ring prevents the boss from expanding and opening up any leakage passageway along the aperture 36, and even should there be some small expansion, the flexible bushing being under compression, would compensate therefor.

Figure 5:
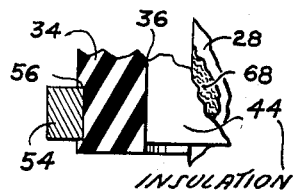
Fig. 5 is a fragmentary section through the lower portion of a battery cover boss illustrating an additional form of the invention.

While the ring 54 may be pressed on the outside of the boss of a premolded cover, it may also be placed in seat 56 as illustrated in Figure 5 by proper placing in a mold at the time the cover is formed.

Figure 6:
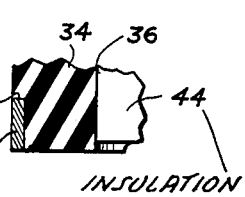
Fig. 6 is a view, similar to Fig. 5, showing still another form of the invention.

Still another form of the invention may comprise ring or band 58 pressed or molded into seat 60 (Fig. 6) about a terminus of the boss.

Figure 7:
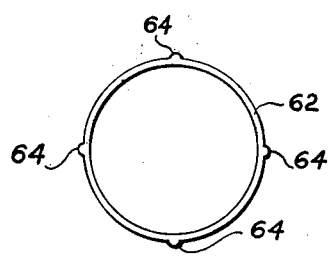
Fig. 7 is a plan view of a modification of the reinforcing ring which may be used in the invention herein; and, Fig. 8 is a view, similar to Fig. 6, wherein a reinforcing ring of the type shown in Fig. 7 is entirely embedded within a terminal boss.
Figure 8:
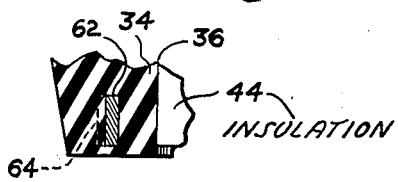

The reinforcing may likewise be accomplished as shown in Figures 7 and 8, by the use of a ring or band 62 having ribs 64 thereon and this type of ring or even a smooth surface, corrugated, or milled ring may be entirely embedded within the boss 34 during the fabrication of the cover.

In the assembly of the parts shown in Figure 1, the terminal post, whether tapered or not, may be thrust through the aperture 36 with a flexible bushing between it and the cover to compress said bushing therebetween. Final positioning may be determined by stops 66 on the posts also serving as the cover mounts. It is some times desirable to lubricate the posts before assembly and it is found that while glycerine or some such substance may be satisfactory, even water facilitates this operation. Additionally, an adhesive, such as a suitable rubber cement 68, see Figures 3 and 5, may be used and in this latter instance, of course, such adhesive is an additional sealing factor but has been found not to be particularly necessary under usual conditions.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation.

What is claimed and it is desired to obtain by United States Letters Patent:

1. In an electric storage battery including a container housing electrodes and an electrolyte therein, a molded cover for said container and provided with an aperture, a boss formed on said cover extending toward said electrodes pierced by said aperture, a terminal post extending from one of said electrodes through the aperture and in concentric relation with the boss, a resilient bushing positioned in compressed relation between said terminal post and the aperture, and a reinforcing ring positioned externally of said boss for maintaining compression upon the resilient bushing.

2. In an electric storage battery including a container for housing electrodes and an electrolyte therein, a molded cover therefor provided with a downwardly extending boss pierced by an aperture, a terminal post extending from one of said electrodes extending through the aperture in the boss, a body of resilient material positioned between the terminal post and the aperture in compressed condition to form a seal, and a reinforcing ring having portions embedded in said boss to prevent expansion of the cover material adjacent the boss due to the compressed condition of the resilient material.

3. In an electric storage battery including a container housing electrodes and an electrolyte therein, a molded cover therefor provided with a downwardly extending boss pierced by an aperture having a downwardly facing seat, a terminal post extending from one of the electrodes through the aperture, a resilient bushing of rubber-like material positioned under compression about the terminal post between the terminal post and the aperture against the seat, and a reinforcing band of inert metal cooperating with said boss to maintain the compression on said bushing.

HARLAND D. WILSON.

REFERENCES CITED

The following references are of record in the file of this patent:

UNITED STATES PATENTS

| Number | Name | Date |
| --- | --- | --- |
| 1,329,917 | Marko | Feb. 3, 1920 |
| 1,364,861 | Bliss | Jan. 11, 1921 |
| 1,368,817 | Marko | Feb. 15, 1921 |
| 1,376,905 | Sturges | May 3, 1921 |
| 1,386,946 | Norris | Aug. 9, 1921 |
| 1,411,414 | Cook | Apr. 4, 1922 |
| 1,474,829 | Lyndon | Nov. 20, 1923 |
| 1,582,012 | Hugo | Apr. 20, 1926 |
| 1,926,157 | Lormor et al. | Sept. 12, 1933 |
| 2,071,469 | Lormor | Feb. 23, 1937 |
| 2,076,341 | Henry | Apr. 6, 1937 |
| 2,148,738 | Feldtkeller | Feb. 28, 1939 |
| 2,242,599 | Raney | May 20, 1941 |